US011018507B2

(12) United States Patent
Nagakura et al.

(10) Patent No.: US 11,018,507 B2
(45) Date of Patent: May 25, 2021

(54) DETECTION APPARATUS, POWER CONDITIONER, DETECTION METHOD, AND COMPUTER READABLE MEDIUM

(71) Applicant: FUJI ELECTRIC CO., LTD., Kanagawa (JP)

(72) Inventors: Takayuki Nagakura, Yokohama (JP); Hideyuki Ito, Tachikawa (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 31 days.

(21) Appl. No.: 16/286,595

(22) Filed: Feb. 27, 2019

(65) Prior Publication Data

US 2019/0199099 A1  Jun. 27, 2019

Related U.S. Application Data

(63) Continuation of application No. PCT/JP2018/005116, filed on Feb. 14, 2018.

(30) Foreign Application Priority Data

Mar. 10, 2017  (JP) .............................. JP2017-046246

(51) Int. Cl.
*H02J 3/00* (2006.01)
*H02J 3/38* (2006.01)

(52) U.S. Cl.
CPC ............. *H02J 3/381* (2013.01); *H02J 3/005* (2013.01); *H02J 3/38* (2013.01); *H02J 3/388* (2020.01)

(58) Field of Classification Search
CPC .... H02J 3/381; H02J 3/38; H02J 3/005; H02J 3/388; Y02E 10/56
USPC ......................................................... 307/51
See application file for complete search history.

(56) References Cited

FOREIGN PATENT DOCUMENTS

| JP | 2008054366 | * | 3/2008 |
| JP | 2008054366 | A | 3/2008 |
| JP | 2014214119 | A | 11/2014 |
| JP | 2015004533 | A | 1/2015 |
| JP | 2016003224 | A | 1/2016 |

(Continued)

OTHER PUBLICATIONS

International Search Report for International Patent Application No. PCT/JP2018/005116, issued by the Japan Patent Office dated Mar. 20, 2018.

(Continued)

*Primary Examiner* — Rexford N Barnie
*Assistant Examiner* — Xuan Ly

(57) ABSTRACT

An islanding operation is detected appropriately through interconnection to the power grid which may have various characteristics. A detection apparatus is provided, which includes a frequency parameter calculation unit configured to calculate frequency parameters according to frequencies of power supplied by a power supply, a deviation parameter calculation unit configured to calculate a deviation parameter according to a frequency deviation based on the frequency parameters in a first term and the frequency parameters in a second term earlier than the first term, an islanding operation detection unit configured to detect whether the power supply is in an islanding operation based on the deviation parameter, and a time gap change unit configured to change a time gap between the first term and the second term.

18 Claims, 8 Drawing Sheets

(56) References Cited

FOREIGN PATENT DOCUMENTS

| JP | 2016082789 | A  |   | 5/2016 |
|----|------------|----|---|--------|
| JP | 2016131441 |    | * | 7/2016 |
| JP | 2016131441 | A  |   | 7/2016 |
| JP | 6086271    | B1 |   | 3/2017 |

OTHER PUBLICATIONS

International Preliminary Report on Patentability for International Application No. PCT/JP2018/005116, issued by Japan Patent Office dated Mar. 20, 2018.

* cited by examiner

DETECTION APPARATUS, POWER CONDITIONER, DETECTION METHOD, AND COMPUTER READABLE MEDIUM

The contents of the following Japanese patent application(s) are incorporated herein by reference:
NO. 2017-046246 filed in JP on Mar. 10, 2017, and
NO. PCT/JP2018/005116 filed on Feb. 14, 2018.

BACKGROUND

1. Technical Field

The present invention relates to a detection apparatus, a power conditioner, detection method, and a detection program.

2. Related Art

In the prior art, an islanding operation detection system is known, which detects that a distributed power supply is in an islanding operation state due to power outage of a grid power supply in a grid interconnection system in which a distributed power supply such as a photovoltaic power generation system is linked to the grid power supply (For example, see Patent documents 1 and 2).

Patent document 1: Japanese Unexamined Patent Application Publication No. 2016-82789
Patent document 2: Japanese Unexamined Patent Application Publication No. 2016-131441

SUMMARY

Since the characteristics of a power grid to which a distributed power supply is connected vary depending on where the distributed power supply is connected, it is required that an islanding operation detection system appropriately work through interconnection to the power grid which may have various characteristics.

(Item 1)
According to the first aspect of the present invention, a detection apparatus is provided. The detection apparatus may include a frequency parameter calculation unit configured to calculate frequency parameters according to frequencies of power supplied by a power supply. The detection apparatus may include a deviation parameter calculation unit configured to calculate a deviation parameter according to a frequency deviation based on the frequency parameters in a first term and the frequency parameters in a second term earlier than the first term. The detection apparatus may include an islanding operation detection unit configured to detect whether the power supply is in an islanding operation based on the deviation parameter. The detection apparatus may include a time gap change unit configured to change a time gap between the first term and the second term.

(Item 2)
The detection apparatus may include a flicker detection unit configured to detect whether flicker occurs in the power supplied by the power supply. The time gap change unit may change the time gap between the first term and the second term in response to detection of flicker.

(Item 3)
In a case in which the time gap between the first term and the second term has been changed from a first time gap to a second time gap in response to detection of flicker, the time gap change unit may change the time gap between the first term and the second term to a third time gap different from the first time gap and the second time gap in response to further detection of flicker.

(Item 4)
The time gap change unit may continue to change the time gap between the first term and the second term by using a plurality of predetermined time gaps in a predetermined order until flicker is no longer detected.

(Item 5)
The flicker detection unit may calculate a flicker period parameter according to a period of flicker. The time gap change unit may change the time gap between the first term and the second term to a value based on the flicker period parameter.

(Item 6)
The detection apparatus may further include a term change unit configured to change a length of the second term.

(Item 7)
The term change unit may change the length of the second term in response to detection of flicker.

(Item 8)
When making the second term longer, the term change unit may calculate the frequency parameters in the second term by thinning out the frequency parameters sampled during the second term.

(Item 9)
The deviation parameter calculation unit may calculate the deviation parameter corresponding to each of a plurality of predetermined time gaps between the first term and the second term. The time gap change unit may preferentially select, from among the plurality of deviation parameters corresponding to the plurality of time gaps, a deviation parameter having a smaller amount of change.

(Item 10)
The detection apparatus may further include a reactive power injection unit configured to inject reactive power according to the deviation parameter into a power supply route.

(Item 11)
The detection apparatus may further include a communication unit configured to communicate with an apparatus of a power company. The time gap change unit may change the time gap between the second term and the first term to a time gap designated by an instruction received from the apparatus of the power company.

(Item 12)
The deviation parameter calculation unit may calculate the deviation parameter based on a value obtained by performing low-pass filtering on the frequency parameters having a plurality of periods within the second term.

(Item 13)
According to the second aspect of the present invention, provided is a power conditioner including a power conversion unit configured to convert power from a distributed power supply into alternating current compatible with a grid power supply and the above-described detection apparatus.

(Item 14)
According to the third aspect of the present invention, a detection method is provided. The detection method may include calculating frequency parameters according to frequencies of power supplied by a power supply. The detection method may include calculating a deviation parameter according to a frequency deviation based on the frequency parameters in a first term and the frequency parameters in a second term earlier than the first term. The detection method may include detecting whether the power supply is in an islanding operation based on the deviation parameter. The detection method may include changing time gap between the first term and the second term.

(Item 15)

According to the fourth aspect of the present invention, a detection program to be executed by a detection apparatus is provided. The detection program may cause the detection apparatus to serve as a frequency parameter calculation unit for calculating frequency parameters according to frequencies of power supplied by a power supply. The detection program may cause the detection apparatus to serve as a deviation parameter calculation unit for calculating a deviation parameter according to a frequency deviation based on the frequency parameters in a first term and the frequency parameters in a second term earlier than the first term. The detection program may cause the detection apparatus to serve as an islanding operation detection unit for detecting whether the power supply is in an islanding operation based on the deviation parameter. The detection program may cause the detection apparatus to serve as a time gap change unit for changing a time gap between the first term and the second term.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention is described through the embodiments of the invention. However, the following embodiments do not limit the invention according to the claims. Also, all the combinations of the features described in the embodiments are not necessarily essential to means provided by aspects of the invention.

Figure 1:
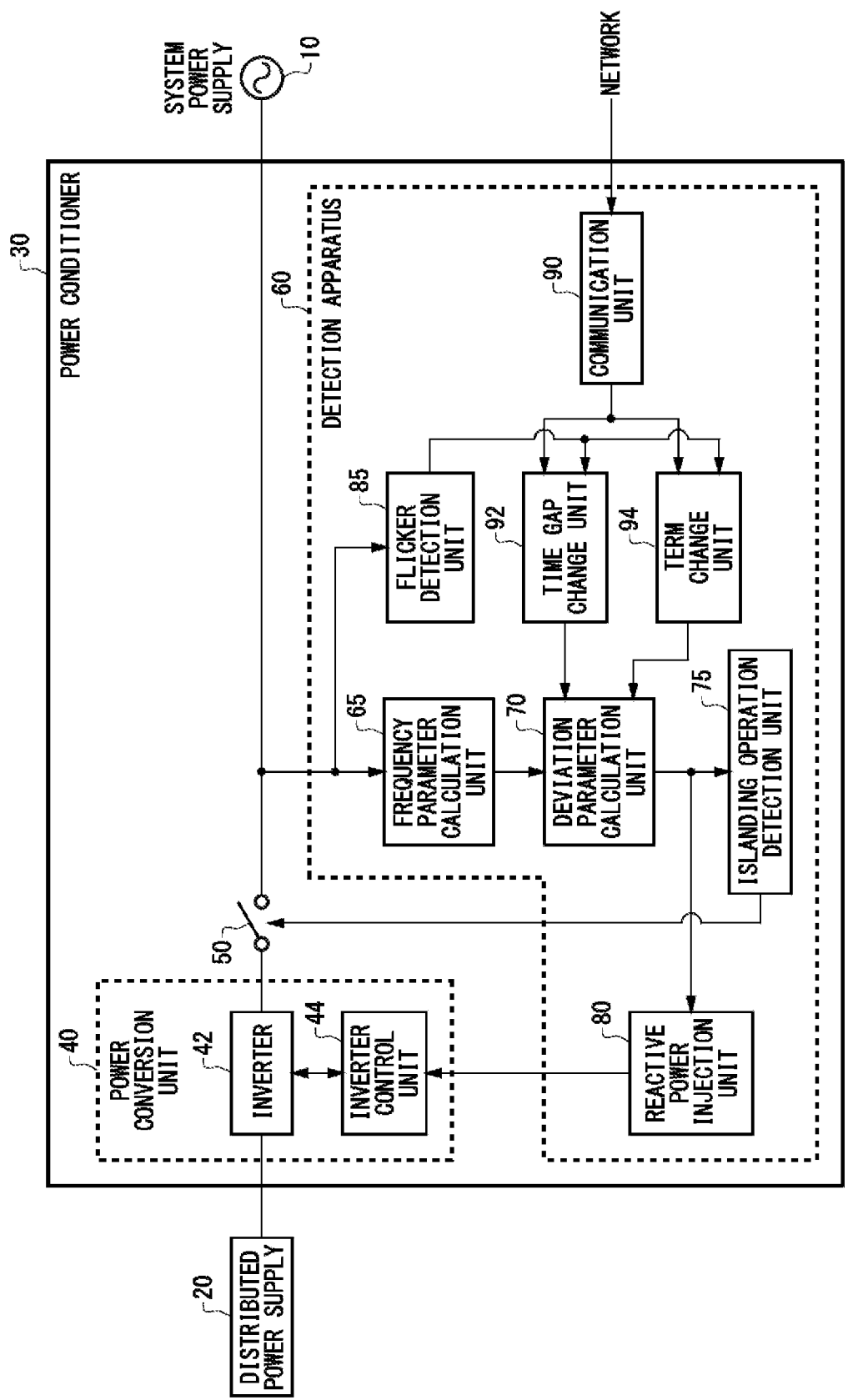
FIG. 1 shows a configuration of a grid interconnection system 1 according to this embodiment.

FIG. 1 shows a configuration of a grid interconnection system 1 according to this embodiment. The grid interconnection system 1 includes a grid power supply 10 included in a power grid provided by a power company or the like, a distributed power supply 20 such as a photovoltaic power generation system, a wind power generation system, and a fuel cell power generation system, and a power conditioner 30 provided between the grid power supply 10 and the distributed power supply 20 and to convert power from the distributed power supply 20 to supply the grid power supply 10 with the power. The power conditioner 30 detects that the grid power supply 10 side is separated from the power grid and in an islanding operation state because supply of power from the grid power supply 10 is interrupted due to an accidental power outage, a planned power outage, a maintenance power outage and the like of the power grid. As an example, the power conditioner 30 according to this embodiment cuts off the connection between the distributed power supply 20 side and the grid power supply 10 side in response to the detection of the islanding operation. In this manner, the power conditioner 30 can ensure the safety of work or inspection on the power grid side and/or protect power distribution equipment of the power grid side.

The power conditioner 30 includes a power conversion unit 40, an interconnection relay 50, and a detection apparatus 60. The power conversion unit 40 has an inverter 42 and an inverter control unit 44 and converts power from the distributed power supply 20 into alternating current compatible with the grid power supply 10. The inverter 42 converts DC power or AC power from the distributed power supply 20 into AC power conforming to the power grid to output the AC power. The inverter control unit 44 controls the inverter 42 to match the voltage, the frequency, and the phase of the AC power output by the inverter 42 to the power of the power grid side.

The interconnection relay 50 is a switch provided between the power conversion unit 40 and the grid power supply 10 side. The interconnection relay 50 makes or cuts off the connection between the power conversion unit 40 and the grid power supply 10 side in response to the control from the detection apparatus 60. In this manner, the interconnection relay 50 makes or cuts off the connection between the power conversion unit 40 on the distributed power supply 20 side and the grid power supply 10 side to switch between connection and disconnection of the grid power supply 10 to the power grid. Note that although the power conditioner 30 according to this embodiment has the interconnection relay 50 built-in, the interconnection relay 50 may be located outside the power conditioner 30 instead.

When detecting that the grid power supply 10 is in an islanding operation state, the detection apparatus 60 switches the state of the interconnection relay 50 to the cut-off state. The detection apparatus 60 is a control computer including a CPU such as a microcontroller or the like, and serves as the respective units indicated below by executing a detection program. Alternatively, the detection apparatus 60 may be realized by means of dedicated circuitry or programmable circuitry. The detection apparatus 60 according to this embodiment has a frequency parameter calculation unit 65, a deviation parameter calculation unit 70, an islanding operation detection unit 75, a reactive power injection unit 80, a flicker detection unit 85, a communication unit 90, a time gap change unit 92, and a term change unit 94.

The frequency parameter calculation unit 65 calculates frequency parameters according to frequencies of power supplied by the distributed power supply 20, that is, for example, the source power flowing through the power supply route between the interconnection relay 50 and the grid power supply 10 in this embodiment. In this embodiment, the frequency parameter calculation unit 65 detects a voltage of the power supply route between the interconnection relay 50 and the grid power supply 10 to calculate the frequency of the source power as an example of a frequency parameter based on change in the voltage. Alternatively, the frequency parameter calculation unit 65 may detect current flowing the wiring to calculate the frequency parameter. The detection apparatus 60 can use a period instead of using a frequency as the frequency parameter. A period is nothing less than a reciprocal of a frequency. Therefore, a person skilled in the art can understand that using a period as the frequency parameter is also substantially described in this specification. Also, the frequency parameter may be a value changing according to a frequency or a period rather than the frequency or the period itself.

The deviation parameter calculation unit 70 calculates a deviation parameter according to a frequency deviation based on the frequency parameters in a certain term (a first term) and the frequency parameters for a second term earlier than the first term. In this embodiment, the deviation parameter calculation unit 70 receives a sequence of frequency parameters output by the frequency parameter calculation unit 65 to calculate a representative value of a plurality of frequency parameters in the first term having a predetermined time length corresponding to the current term and a representative value of a plurality of frequency parameters in the second term having a predetermined time length corresponding to the previous term. The representative value for the first term and the representative value for the second term may be, for example, moving average values of the frequency parameters in the first term and the second term.

The deviation parameter calculation unit 70 according to this embodiment calculates a deviation parameter according to a deviation between the representative value of the frequency parameters in the first term and the representative value of the frequency parameters in the second term, that is, for example, a frequency deviation obtained by subtracting the representative value of the frequency parameters in the second term from the representative value of the frequency parameters in the first term. Alternatively, the deviation parameter may be a period deviation, or values changing according to the deviation parameter and the period deviation, or the like.

The islanding operation detection unit 75 detects whether the power supply is in an islanding operation based on the deviation parameter output by the deviation parameter calculation unit 70. As an example, when detecting change of the deviation parameter equal to or larger than a reference, the islanding operation detection unit 75 determines that the distributed power supply 20 is in the state where the distributed power supply 20 alone supplies source power as a result of interruption of supply of power by the grid power supply 10.

The reactive power injection unit 80 injects, into the power supply route, reactive power according to the deviation parameter output by the islanding operation detection unit 75. The detection apparatus 60 according to this embodiment adopts, for example, the active detection method of islanding operation, and injects reactive power into the power supply route between the power conversion unit 40 and the grid power supply 10 to detect islanding operation using the fact that, in the case of islanding operation, the frequency of a source power significantly changes under the effect of the reactive power injection. Alternatively, the detection apparatus 60 may adopt a passive detection method of islanding operation for detecting the change of the frequency parameter exceeding a reference range which occurs when the distributed power supply 20 transitions from the linking state to the islanding operation state, without injection of reactive power. When the passive detection method of islanding operation is adopted, the detection apparatus 60 may not have the reactive power injection unit 80.

The flicker detection unit 85 detects whether flicker in the source power flowing through the wiring between the interconnection relay 50 and the grid power supply 10 occurs. Flicker is a phenomenon where the voltage of the power supply route is excited due to the reactive power injection by the reactive power injection unit 80, so that voltage fluctuation equal to or greater than a predefined flicker reference periodically occurs in the power supply route. Note that the periodic voltage fluctuation here is not the change of an instantaneous voltage at an AC frequency in an AC voltage, but mainly a fluctuation of the maximum voltage (or the effective voltage or the average voltage) in a period longer than the AC frequency (for example, several Hz).

The communication unit 90 communicates with an apparatus of a power company over a dedicated or a general-purpose network and receives various commands given to the detection apparatus 60 from the power company.

The time gap change unit 92 changes a time gap between the first term and the second term which is used when the deviation parameter calculation unit 70 calculates the deviation parameter. In this embodiment, the time gap between the first term and the second term is defined as the time gap from the end timing of the second term to the end timing of the first term. Alternatively, the time gap between the first term and the second term may be defined as the time gap from the end timing of the second term to the start timing of the first term.

The term change unit 94 changes the second term which is used when the deviation parameter calculation unit 70 calculates the deviation parameter. The term change unit 94 changes, for example, the length of the second term, whether to thin out the frequency parameter samples sampled during the second term, and/or the method for calculating the frequency parameter for the second term. The time gap change unit 92 and the term change unit 94 may perform these changes in response to a command from the power company, in response to detection of flicker, or based on other conditions.

With the power conditioner 30 indicated above, the calculation method by which the deviation parameter calculation unit 70 calculates the deviation parameter can be changed, such as in response to a command from the power company and/or detection of flicker, etc. In this manner, the power conditioner 30 can link the distributed power supply 20 to the power grid which may have various characteristics to appropriately detect islanding operation.

Figure 2:
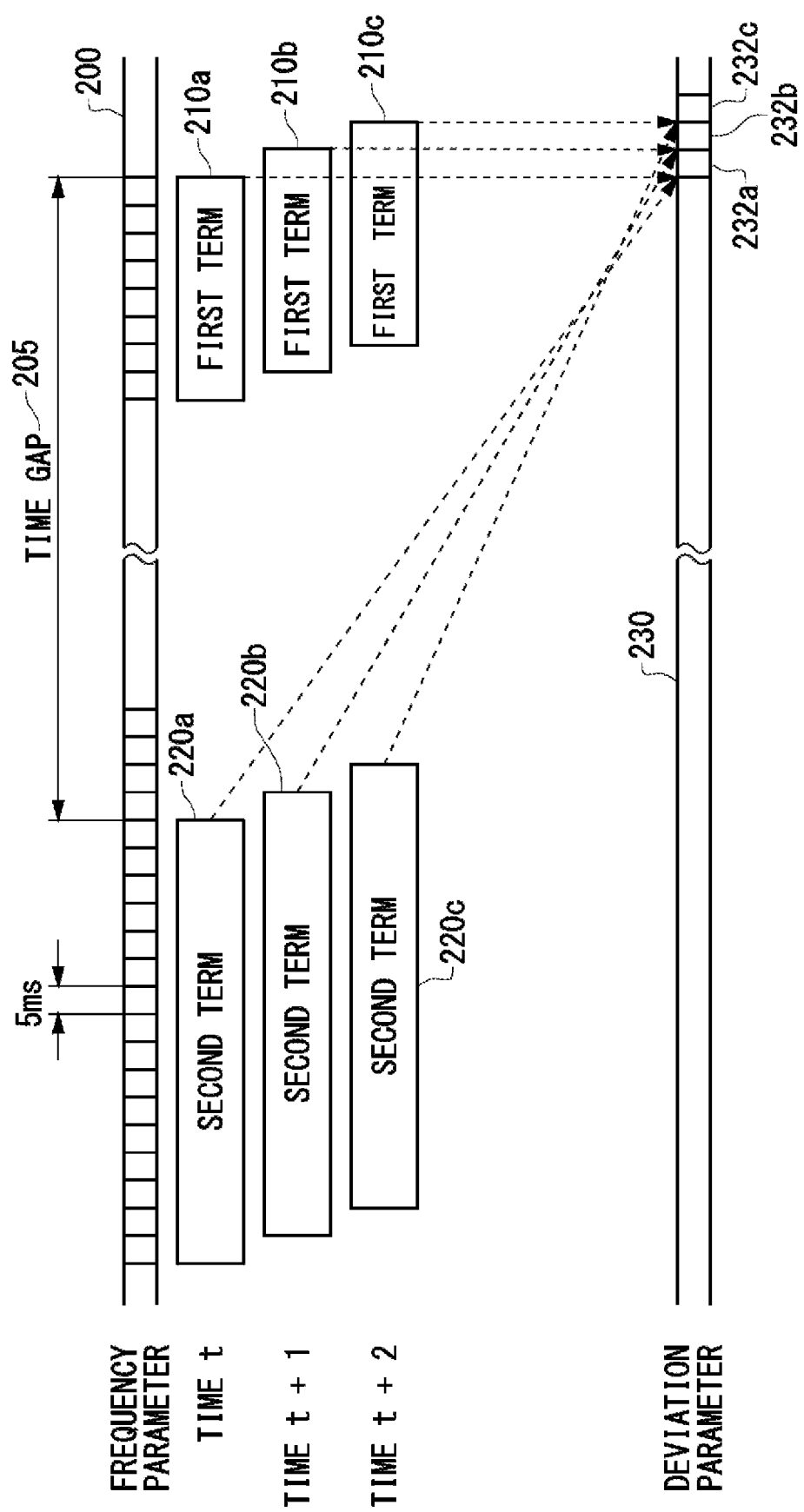
FIG. 2 shows one example of a timing of deviation parameter calculation according to this embodiment.

FIG. 2 shows one example of a timing of the deviation parameter calculation according to this embodiment. The frequency parameter calculation unit 65 outputs a frequency parameter sequence 200 including values of the frequency parameters detected by the frequency parameter calculation unit 65 in each predetermined cycle (5 ms in the example of this figure). The deviation parameter calculation unit 70 calculates the representative value (for example, a moving average value) of the frequency parameters in the first term 210a (for example, 8 cycles=40 ms) and the representative value (for example, a moving average value) of the frequency parameters in the second term 220a (for example, 16 cycles=80 ms) which is a term earlier than the first term 210a by a time gap 205, where first term 210a and the second term 220a correspond to time t. Then, the deviation parameter calculation unit 70 calculates a deviation parameter 232a at time t based on the representative value of the frequency parameters in the first term 210a and the representative value of the frequency parameters in the second term 220a. In this embodiment, the deviation parameter calculation unit 70 calculates the difference obtained by subtracting the representative value of the frequencies in the second term 220a from the representative value of the frequencies in the first term 210a as a deviation parameter 232a. Alternatively, the deviation parameter calculation unit 70 may calculate a different type of deviation parameter, such as by calculating the ratio of the frequency parameter for the first term 210a to the frequency parameter for the second term 220a.

Similarly, the deviation parameter calculation unit 70 calculates the representative value of the frequencies in the first term 210b and the representative value of the frequencies in the second term 220b which correspond to next time t+1, and calculates a deviation parameter 232b at time t+1 based on them. Also, the deviation parameter calculation unit 70 calculates the representative value of the frequencies in the first term 210c and the representative value of the frequencies in the second term 220c which correspond to time t+2 which is time next to time t+1, and calculates a deviation parameter 232c at time t+2 based on them. In this manner, the deviation parameter calculation unit 70 can output a deviation parameter sequence 230 corresponding to the respective cycles, including the deviation parameters 232a to 232c.

Figure 3:
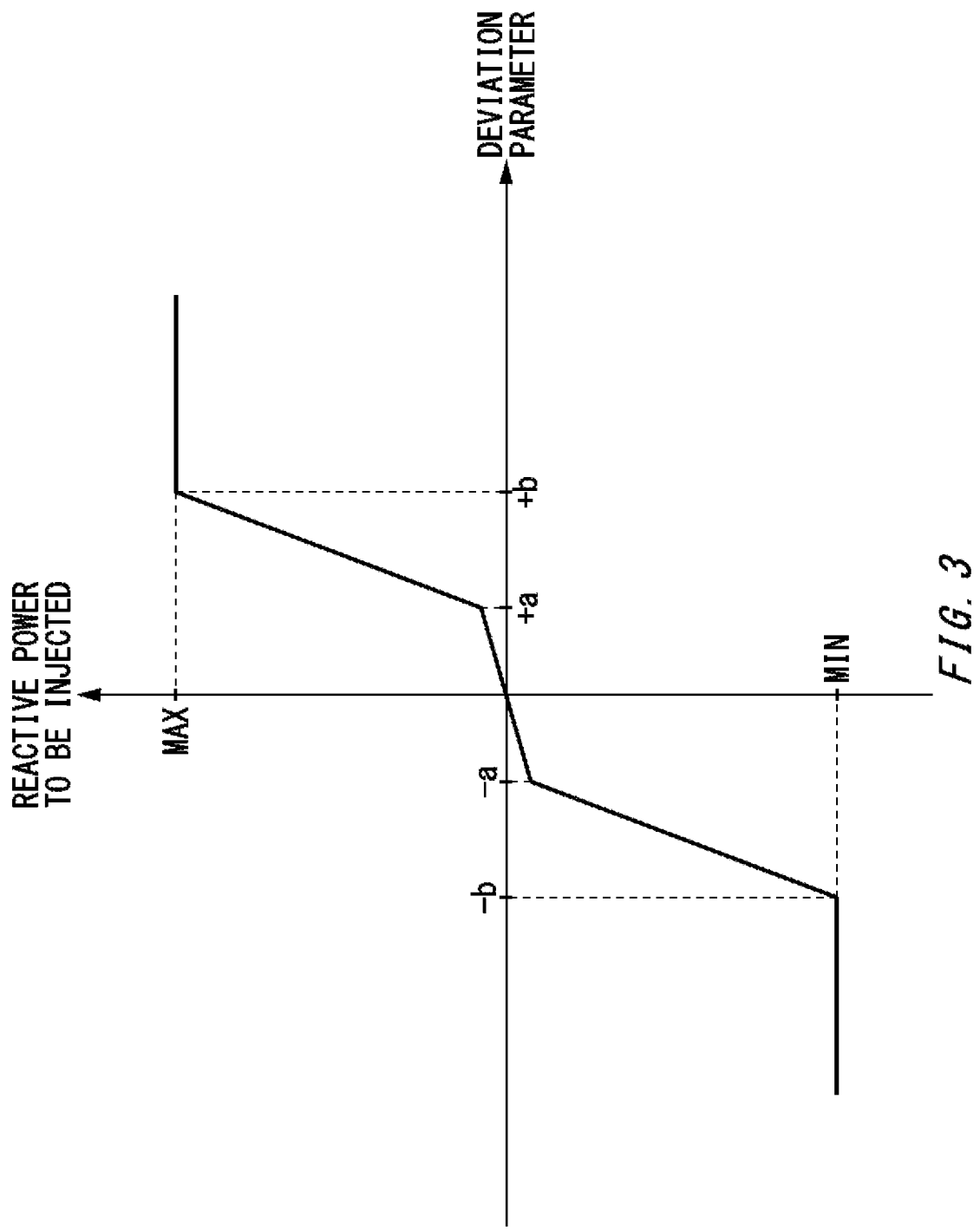
FIG. 3 shows one example of a relationship between a deviation parameter and an amount of injected reactive power according to this embodiment.

FIG. 3 shows one example of a relationship between the deviation parameter and an amount of injected reactive power according to this embodiment. In this figure, the horizontal axis represents a deviation parameter (for example, the frequency deviation) received from the deviation parameter calculation unit 70 and the vertical axis represents reactive power which should be injected into the power supply route. The reactive power injection unit 80 controls the power conversion unit 40 to calculate, from the graph in FIG. 3, the amount of reactive power which should be injected according to the deviation parameter received from the deviation parameter calculation unit 70 and inject the calculated reactive power into the power supply route. In this manner, the reactive power injection unit 80 injects the reactive power in the direction for increasing the deviation generated in the power supply route, so that islanding operation state is easily detected.

The reactive power injection unit 80 controls the injection amount of reactive current according to the deviation parameter to be relatively small when the deviation parameter is in the range from −a to +a. In this manner, the reactive power injection unit 80 prevents disturbance in the power grid due to the injection of a large amount of reactive power into the power supply route when the distributed power supply 20 is interconnected to the power grid, and thus the deviation between the distributed power supply 20 and the power grid is small. The reactive power injection unit 80 controls the injection amount of reactive power according to the deviation parameter to be relatively large when the deviation parameter is in the ranges from −b to −a and from +a to +b. Thus, the reactive power injection unit 80 injects a relatively large amount of reactive power into the power supply route in response to a magnitude of the deviation parameter being a or more as a result of separation of the distributed power supply 20 from the power grid, so that an islanding operation state is easily detected. The reactive power injection unit 80 maintains the injection amount of reactive power to be the minimum value or the maximum value without further increasing the injection amount of reactive power when the deviation parameter is in the range of −b or smaller or +b or larger. In this manner, the reactive power injection unit 80 prevents the reactive power from being injected excessively to the power supply route.

Figure 4:
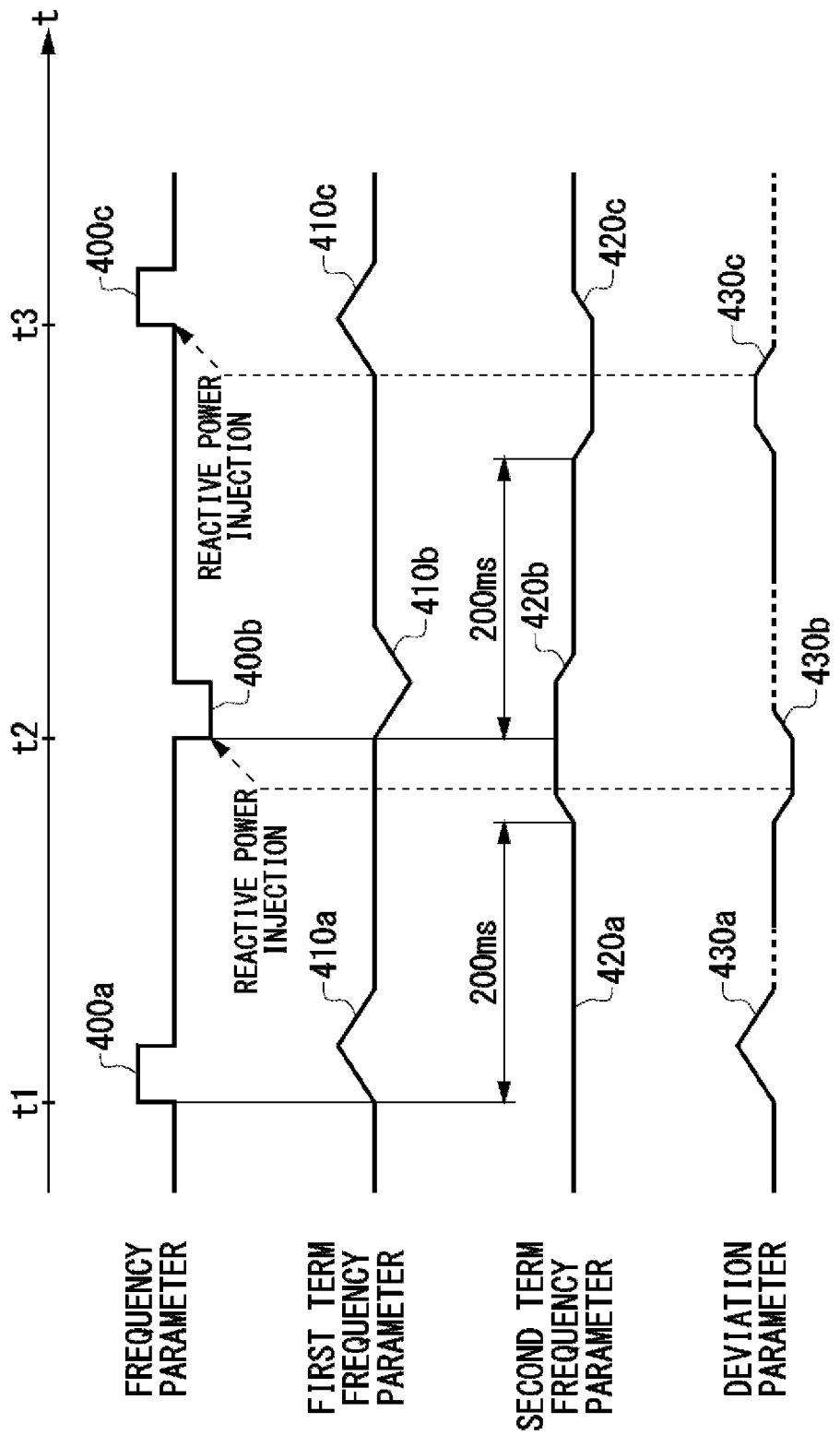
FIG. 4 shows one example of a situation in which flicker occurs in the grid interconnection system 1.

FIG. 4 shows one example of a situation in which flicker occurs in the grid interconnection system 1. In this figure, the horizontal axis represents a lapse of time, and from top to down represented are the frequency parameter calculated by the frequency parameter calculation unit 65, a first term frequency parameter which is the representative value of the frequency parameters in the first term and is calculated by the deviation parameter calculation unit 70, a second term frequency parameter which is the representative value of the frequency parameters in the second term and is calculated by the deviation parameter calculation unit 70, and the deviation parameter output by the deviation parameter calculation unit 70.

This figure shows the situation in which the distributed power supply 20 is interconnected to the power grid and is not in an islanding operation state, although the frequency of the power supply route fluctuates. At time $t_1$, upon the temporary increase in the frequency of the source power due to the fluctuation of the grid power supply 10 or the like, the frequency parameter calculation unit 65 detects the frequency parameter 400a which is larger than a reference value. The deviation parameter calculation unit 70 calculates a first term frequency parameter 410a which is affected by the increase in the frequency parameter 400a. In this figure, since the time gap 205 in FIG. 2 is fixed to 200 ms, the second term frequency parameter 420b increases 200 ms after time $t_1$. However, the second term frequency parameter 420a corresponding to the term in which the first term frequency parameter 410a increases has not yet changed. As a result, the deviation parameter calculation unit 70 calculates the deviation parameter 430a which is positive based on the increased first term frequency parameter 410a and the unchanged second term frequency parameter 420a.

When the second term frequency parameter 420b increases before time $t_2$, the deviation parameter calculation unit 70 calculates a deviation parameter 430b which is negative. The reactive power injection unit 80 injects reactive power for helping the frequency parameter decrease into the power supply route in response to the negative deviation parameter 430b. The power grid is relatively easily affected by the reactive power injection such as when the distributed power supply 20 is connected to the edge of the power grid, so that the frequency of the source power may decrease as in a frequency parameter 400b.

With the decrease in the frequency parameter 400b, the second term frequency parameter 420c also decreases 200 ms after time $t_2$. As a result, the deviation parameter calculation unit 70 calculates the deviation parameter 430c which is positive based on the first term frequency parameter 410c which is around the reference value and the decreased second term frequency parameter 420c. At time $t_3$, the reactive power injection unit 80 injects reactive power for helping the frequency parameter increase into the power supply route in response to the positive deviation parameter 430c. In response, the frequency parameter of the source power may change to a value larger than the reference value, so that the frequency parameter calculation unit 65 detects the frequency parameter 400c which is a value larger than the reference value.

According to the example of this figure, reactive power causing the frequency of the source power to decrease is injected at time $t_2$ and reactive power causing the frequency of the source power to increase is injected at time $t_3$. Likewise, the two types of reactive power having different directions are alternately injected into the power supply route in a fixed cycle. When the timing of reactive power injection coincides with the timing of voltage fluctuation of the power supply route, the voltage of the power supply route is excited, the periodic voltage fluctuation is promoted, and flicker occurs.

In the above, the situation in which flicker occurs is described quantitatively and briefly using a simple example. However, in practice, in what case flicker occurs and what period/length of flicker occurs differ depending on the characteristics of the portion of the power grid to which the grid power supply 10 and the power conditioner 30 are connected, the detection method of islanding operation used in the power conditioner 30, and the like. Therefore, it is difficult to predict them in advance. To address this, the power conditioner 30 according to this embodiment may change the calculation method of the deviation parameter used in the deviation parameter calculation unit 70 while being connected to the power grid, to be able to adapt to the environment of the portion of the power grid to which the power conditioner 30 is connected.

Figure 5:
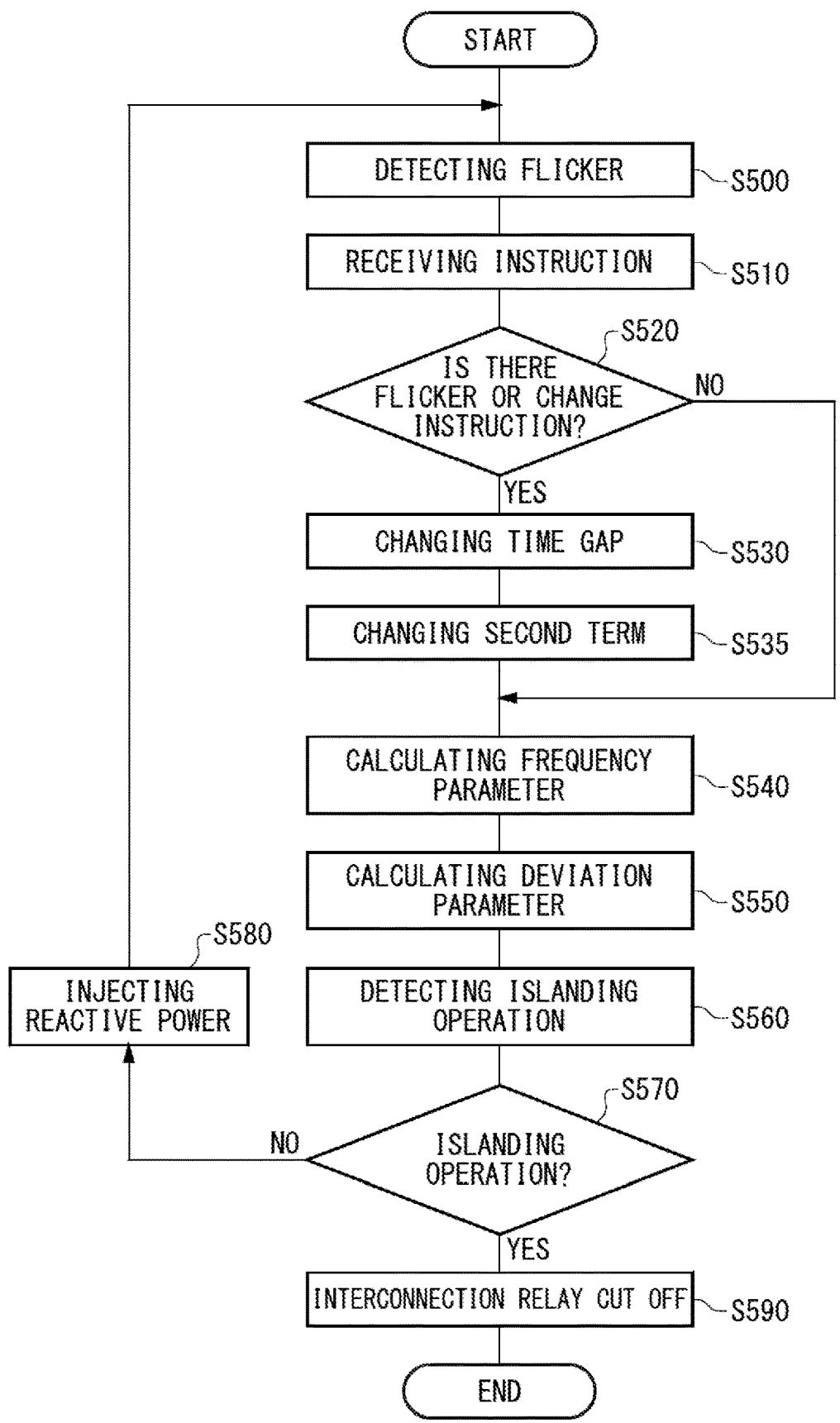
FIG. 5 shows an operation flow of a power conditioner 30 according to this embodiment.

FIG. 5 shows an operation flow of the power conditioner 30 according to this embodiment. At step S500, the flicker detection unit 85 detects whether flicker has occurred in the source power. The flicker detection unit 85 according to this embodiment calculates a flicker period parameter according to the period of flicker by, for example, detecting the voltage of the power supply route (the maximum voltage, the effective voltage, or the average voltage) to observe the periodic voltage fluctuation (that is, the voltage fluctuation due to flicker) in the power supply route. The flicker period parameter here may be the period or the frequency of flicker, or may be the value changing according to the period or the frequency of flicker instead. Note that the flicker detection unit 85 may use various well-known methods such as the method described in Patent document 2 as the detection method of flicker.

At S510, the communication unit 90 receives a command given to the detection apparatus 60 from a power company, if any.

At S520, the time gap change unit 92 and the term change unit 94 judge whether a change condition is met for changing the calculation method of the deviation parameter. The time gap change unit 92 and the term change unit 94 according to this embodiment judge that the change condition is met when the occurrence of flicker is detected or when the command to change the calculation method of the deviation parameter used in the deviation parameter calculation unit 70 is received from the power company. When the change condition is met, the time gap change unit 92 and the term change unit 94 advance the processing to S530. When the change condition is not met, the time gap change unit 92 and the term change unit 94 advance the processing to S540.

At S530, the time gap change unit 92 changes the calculation method of the deviation parameter used in the deviation parameter calculation unit 70. The time gap change unit 92 changes the time gap between the first term and the second term in response to the detection of flicker using any one of the methods illustrated below.

(1) Selecting an appropriate time gap from among a plurality of time gaps by trial and error. The time gap change unit 92 changes the time gap between the first term and the second term from a first time gap to a second time gap in response to detection of flicker under the situation where the time gap between the first term and the second term has been set to the first time gap. When the time gap can be selected from among three different time gaps, the time gap change unit 92 changes the time gap between the first term and the second term to a third time gap different from the first time gap and the second time gap in response to further detection of flicker under the situation where the time gap between the first term and the second term has been changed from the first time gap to the second time gap. When the time gap can be selected from among many more time gaps, the time gap change unit 92 may continue to change the time gap between the first term and the second term until flicker is no longer detected.

In this manner, the time gap change unit 92 can change the term from the increase in the frequency parameter 400a to the increase in the second term frequency parameter 420b, the term from the decrease in the frequency parameter 400b to the decrease in the second term frequency parameter 420c, and the like in FIG. 4, and can change the timing of reactive power injection associated with the decrease in the deviation parameter 430b and the increase in the deviation parameter 430c which follow the increase and decrease in the frequency parameters, by changing the time gap between the first term and the second term. Further, the time gap change unit 92 can adjust the time gap between the first term and the second term so that reactive power can be eventually injected at a suitable timing which results in flicker not occurring, by continuing to change the time gap between the first term and the second term in response to detection of flicker.

Alternatively, the time gap change unit 92 may continue to change the time gap between the first term and the second term by using a plurality of predetermined time gaps in a predetermined order until flicker is no longer detected. By making the same the plurality of time gaps which can be set and making the same the selecting order of these time gaps used by a plurality of power conditioners 30 connected to the power grid in advance, the same time gap can be eventually set by the plurality of power conditioners 30 which are connected at the vicinity of the power grid. In this manner, the situation can be prevented where the respective power conditioners 30 have periods of excitation different from one another to give disturbance to one another as a result of different time gaps being set independently by the power conditioners 30.

(2) Selecting an appropriate time gap according to the period of flicker. The time gap change unit 92 changes the time gap between the first term and the second term to a value based on the flicker period parameter calculated at S500. To be specific, the time gap change unit 92 preferentially selects a time gap which has more difficulty in synchronization with the period of flicker from among a plurality of selectable time gaps as the time gap between the first term and the second term. For example, in FIG. 4, the second term frequency parameter 420b increases after the set time gap from the increase in the frequency parameter 400a, and reactive power is injected into the power supply route after a delay due to the reactive power injection unit 80 from the increase in the second term frequency parameter 420b. Therefore, the detection apparatus 60 injects reactive power into the power supply route after a term from the change of the detected frequency, where the term is obtained by adding delay time specific to the detection apparatus 60 including the delay required for the reactive power injection, and the like to the time gap between the first term and the second term. Therefore, the time gap change unit 92 selects the time gap between the first term and the second term such that this time length obtained by summing up the time gap and the delay time is not coincident with the time length between the peak and the trough of the waveform of flicker, more preferably such that the difference between these time lengths becomes larger.

In this manner, the time gap change unit 92 can appropriately select the time gap between the first term and the second term according to the period of flicker, and thereby can suppress flicker faster than by using (1) which is the method of continuing to change the time gap by trial and error.

Note that as the plurality of time gaps to be used for the time gap between the first term and the second term, time gaps of predetermined values such as 200 ms, 500 ms, and 1 s, for example, may be used, or alternatively, time gaps of consecutive values which follow one another with a predetermined time quantity (for example, 200 ms, 250 ms, 300 ms, . . . , 1000 ms) may be used in each case of above-described (1) and (2).

Also, when there is a designation of the time gap between the first term and the second term by an instruction received from an apparatus of a power company, the time gap change unit 92 changes the time gap between the first term and the second term to the designated time gap.

At S535, the term change unit 94 changes the calculation method of the deviation parameter used in the deviation parameter calculation unit 70 by changing the second term. As an example, the term change unit 94 changes the length of the second term in response to detection of flicker. For example, when flicker is not detected, the term change unit 94 sets the length of the second term to 80 ms as shown in FIG. 2, and upon flicker being detected, the term change unit 94 may change the length of the second term to be longer than 320 ms or the like.

The term change unit 94 can cause the frequency for the second term to be calculated based on the detected frequencies in a longer term by making the length of the second term longer. In this manner, the term change unit 94 can suppress the changes of the second term frequency parameter as in the increase in the second term frequency parameter 420*b* and the decrease in the second term frequency parameter 420*c* in FIG. 4 which are associated with the short-term fluctuation of the frequency parameter. Consequently, the term change unit 94 can reduce the injection of reactive power associated with the change of the second term frequency parameter, and thus can reduce the occurrence of flicker.

Note that the change of the time gap at S530 and the change of the second term at S535 may be performed alternatively in a predetermined order. For example, when flicker cannot be suppressed and flicker is detected again at S520 even after the term change unit 94 first changes the length of the second term in response to detection of flicker, the time gap change unit 92 may change the time gap between the first term and the second term. Conversely, when flicker cannot be suppressed and flicker is detected at S520 even after the time gap change unit 92 first changes the time gap between the first term and the second term once or multiple times in response to detection of flicker, the term change unit 94 may change the length of the second term.

At S540, the frequency parameter calculation unit 65 calculates the frequency parameter according to the frequency of the source power.

At S550, the deviation parameter calculation unit 70 calculates the frequency parameter for the first term and the frequency parameter for the second term, and calculates the deviation parameter according to the frequency deviation based on them. In so doing, in the case in which the length of the second term has been changed by the term change unit 94, the deviation parameter calculation unit 70 calculates the frequency parameter for the second term using the changed length. Also, in the case in which the time gap has been changed by the time gap change unit 92, the deviation parameter calculation unit 70 calculated the deviation parameter using the changed time gap.

At S560, the islanding operation detection unit 75 detects whether the distributed power supply 20 is in an islanding operation based on the deviation parameter. The islanding operation detection unit 75 may use various well-known methods such as the method described in Patent document 1 or Patent document 2 as the detection method of islanding operation.

At S570, the islanding operation detection unit 75 advance the processing to S 580 in response to the fact that islanding operation is not detected, and advance the processing to S590 in response to the fact that islanding operation is detected.

At S580, the reactive power injection unit 80 instructs the inverter control unit 44 in the power conversion unit 40 to inject reactive power according to the deviation parameter calculated at S550 into the power supply route. Then, the reactive power injection unit 80 advances the processing to S500.

At S590, the islanding operation detection unit 75 brings the interconnection relay 50 into the cut-off state for separating the grid power supply 10 in the islanding operation state from the power grid, to end the operation flow of this figure. Note that the interconnection relay 50 of the power conditioner 30 may be manually switched to the connected state, and when supply of power by the power grid is restarted, the interconnection relay 50 may be manually switched back to the interconnection state. Alternatively, the power conditioner 30 may monitor the power supply route between the interconnection relay 50 and the grid power supply 10 while the interconnection relay 50 is in the cut-off state, and in response to the restart of the supply of power by the power grid, switch the interconnection relay 50 to the connected state.

Figure 6:
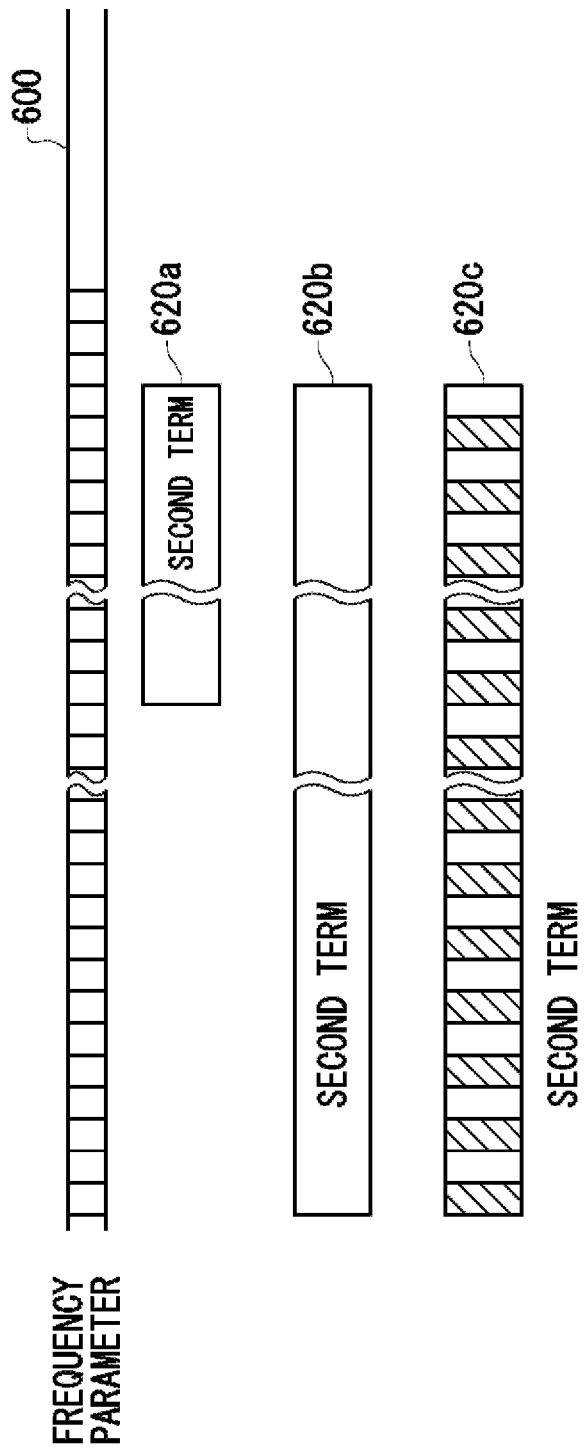
FIG. 6 shows an example of change of a term by a term change unit 94.

FIG. 6 shows an example of change of a term by the term change unit 94. The term change unit 94 may use the second term 620*a* of, for example, 80 ms which is sixteen times as long as the cycle of the frequency sequence 600 before changing the second term at S530 in FIG. 5 (that is, the default state before flicker is detected and/or before the instruction to change the second term, and the like is received). The term change unit 94 may make the length of the second term longer than the second term 620*a* as in the second term 620*b* when changing the second term at S530 in FIG. 5. As an example, the term change unit 94 may use the second term 620*b* of 320 ms which is sixty-four times as long as the cycle of the frequency sequence 600, and the representative value of the frequencies in the second term 620*b* may be calculated from all the frequency samples included in the second term 620*b* (for example, sixty-four frequency samples) in the frequency sequence 600. In so doing, the term change unit 94 may shift the start timing of the second term forward and maintain the end timing to keep the time gap between the first term and the second term unchanged.

When making the second term longer, the term change unit 94 may calculate the frequency parameters in the second term by thinning out the frequency parameters sampled during the second term. The term change unit 94 may remove frequency parameters from the plurality of frequency parameters sampled during the second term at predetermined interval pitches (for example, alternately), as shown in a second term 620*c*, and then the thinned-out frequency parameters may be used to calculate the representative value of the frequency parameters in the second term. As an example, when the second term 620*a* is changed to a longer term as in the second term 620b, the term change unit 94 may thin out the frequency parameter samples included in the second term 620b to suppress the rise in the number of the frequency parameter samples to be used to calculate the representative value or keep the number of the samples the same. In this manner, the term change unit 94 can suppress the rise in the number of the frequency parameter samples within the second term which should be stored to calculate the representative value of the frequency parameters in the second term and suppress the rise in a required storage area even when changing the length of the second term to be longer.

Note that the term change unit 94 may remove anomalous values from the frequency parameter samples included in the second term for the calculation of the representative value of the frequency parameters in the second term. For example, the term change unit 94 may remove samples outside the reference range of the variation from the average across all the frequency parameter samples included in the second term for the calculation of the representative value of the frequency parameters in the second term. Also, the term change unit 94 may remove the frequency parameter having the maximum value (or a predetermined number of frequency parameters from the largest one) and the frequency parameter having the minimum value (or a predetermined number of frequency parameters from the smallest one) from the frequency parameters included in the second term for the calculation of the representative value of the frequency parameters in the second term. In this manner, the term change unit 94 can prevent the representative value of the frequency parameters in the second term from changing significantly due to the short-term change of the detected frequency, and thus reduce the injection of reactive power associated with the change of the frequency for the second term to reduce occurrence of flicker.

Figure 7:
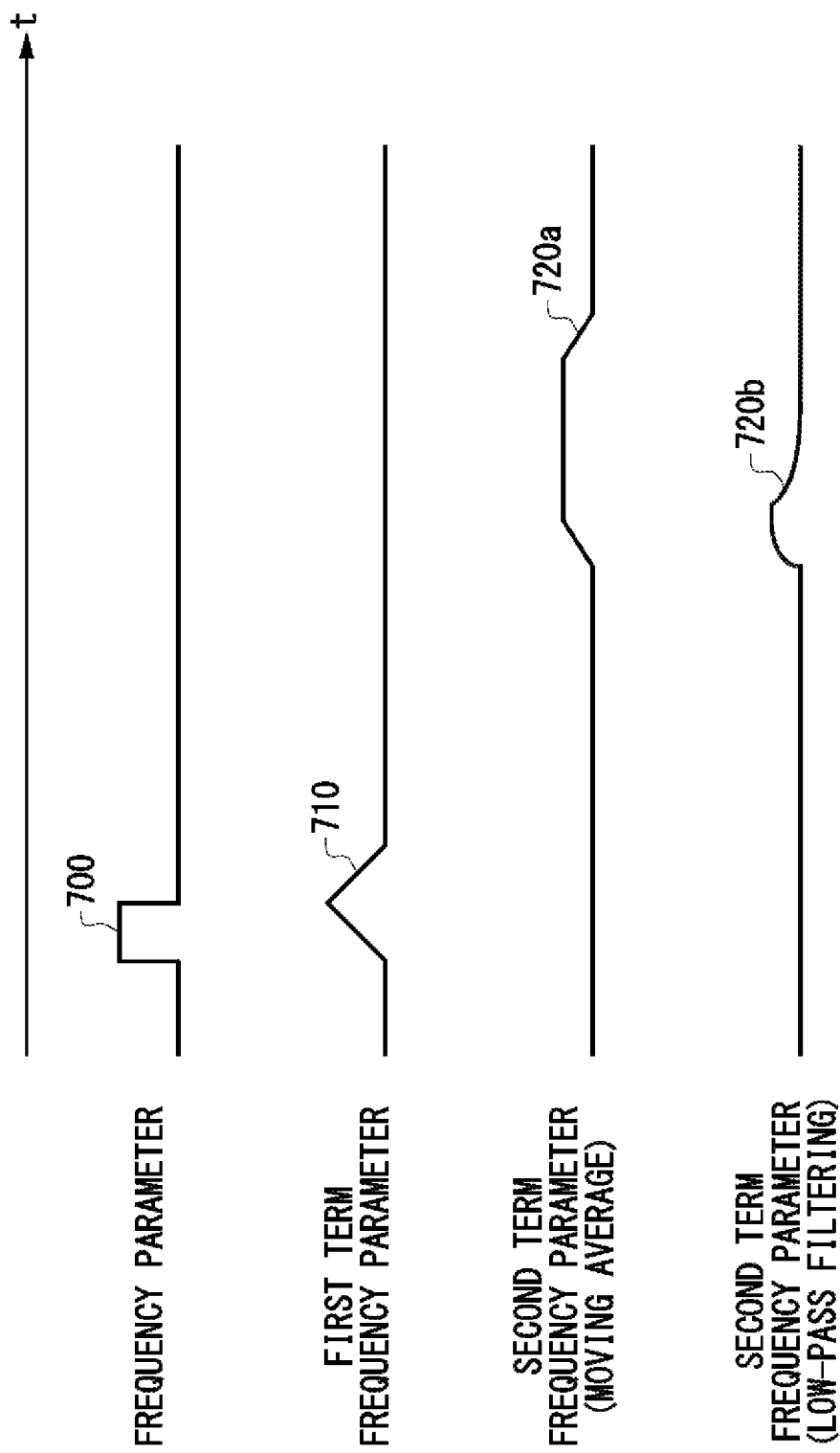
FIG. 7 shows an example of a method for calculating a frequency parameter for a second term by a deviation parameter calculation unit 70.

FIG. 7 shows an example of a method for calculating a frequency parameter for the second term by a deviation parameter calculation unit 70. As shown in FIG. 4, the deviation parameter calculation unit 70 calculates the first term frequency parameter 710 affected by the increase in the frequency parameter 700 in response to detecting the frequency parameter 700 which is larger than a reference, and after the time gap set between the first term and the second term, calculates the increased second term frequency parameter 720a. When the representative value of the frequency parameters in the second term is calculated through the moving average, there is a possibility that it is significantly affected by the increase in the frequency parameter 700 over almost the entire second term.

To address this, the deviation parameter calculation unit 70 may calculate the deviation parameter based on the value obtained by performing low-pass filtering on the frequency parameters having a plurality of periods within the second term. By using the low-pass filtering, the deviation parameter calculation unit 70 can prevent the second term frequency parameter from being affected for a long time due to the short-term fluctuation of the frequency parameter 700 in comparison with the case where the moving average is used. Note that the deviation parameter calculation unit 70 may use the low-pass filtering by which the degree of the influence of the frequency parameter on the representative value in a partial term of a predetermined range extending from the start timing of the second term is made to be smaller than by using the moving average, as in the second term frequency parameter 720b. In this manner, the frequency parameter 700 can suppress the change of the second term frequency parameter faster by using the low-pass filtering than by using the moving average. The deviation parameter calculation unit 70 may use the IIR filter or the FIR filter as the low-pass filter.

Also, various embodiments according to the present invention may be described with reference to flowcharts and block diagrams. The blocks herein may illustrate (1) steps of processes in which operations are performed or (2) sections of an apparatus responsible for performing operations. Certain steps and sections may be implemented by dedicated circuitry, programmable circuitry supplied together with computer-readable instructions stored on computer-readable media, and/or processors supplied together with computer-readable instructions stored on computer-readable media. The dedicated circuitry may include digital and/or analog hardware circuits, or may include integrated circuits (IC) and/or discrete circuits. The programmable circuitry may include reconfigurable hardware circuits that include a logical AND, a logical OR, a logical XOR, a logical NAND, a logical NOR, and other logical operations, and memory elements such as a flip-flop, a register, a field-programmable gate array (FPGA), a programmable logic array (PLA), or the like.

The computer-readable media may include any tangible device that can store instructions for execution by a suitable device, such that the computer-readable medium having instructions stored therein includes an article of manufacture including instructions which can be executed to create means for performing operations specified in the flowcharts or block diagrams. Examples of the computer-readable media may include an electronic storage medium, a magnetic storage medium, an optical storage medium, an electromagnetic storage medium, a semiconductor storage medium, etc. More specific examples of the computer-readable media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY® disc, a memory stick, an integrated circuit card, etc.

The computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA®, C++, etc., and conventional procedural programming languages, such as the "C" programming language or similar programming languages.

The computer-readable instructions may be provided to a processor of a general purpose computer, special purpose computer, or other programmable data processing apparatus, or to programmable circuitry, locally or via a local area network (LAN), wide area network (WAN) such as the Internet, etc., to execute the computer-readable instructions to create means for performing operations specified in the flowcharts or block diagrams. Examples of processors include computer processors, processing units, microprocessors, digital signal processors, controllers, microcontrollers, etc.

Figure 8:
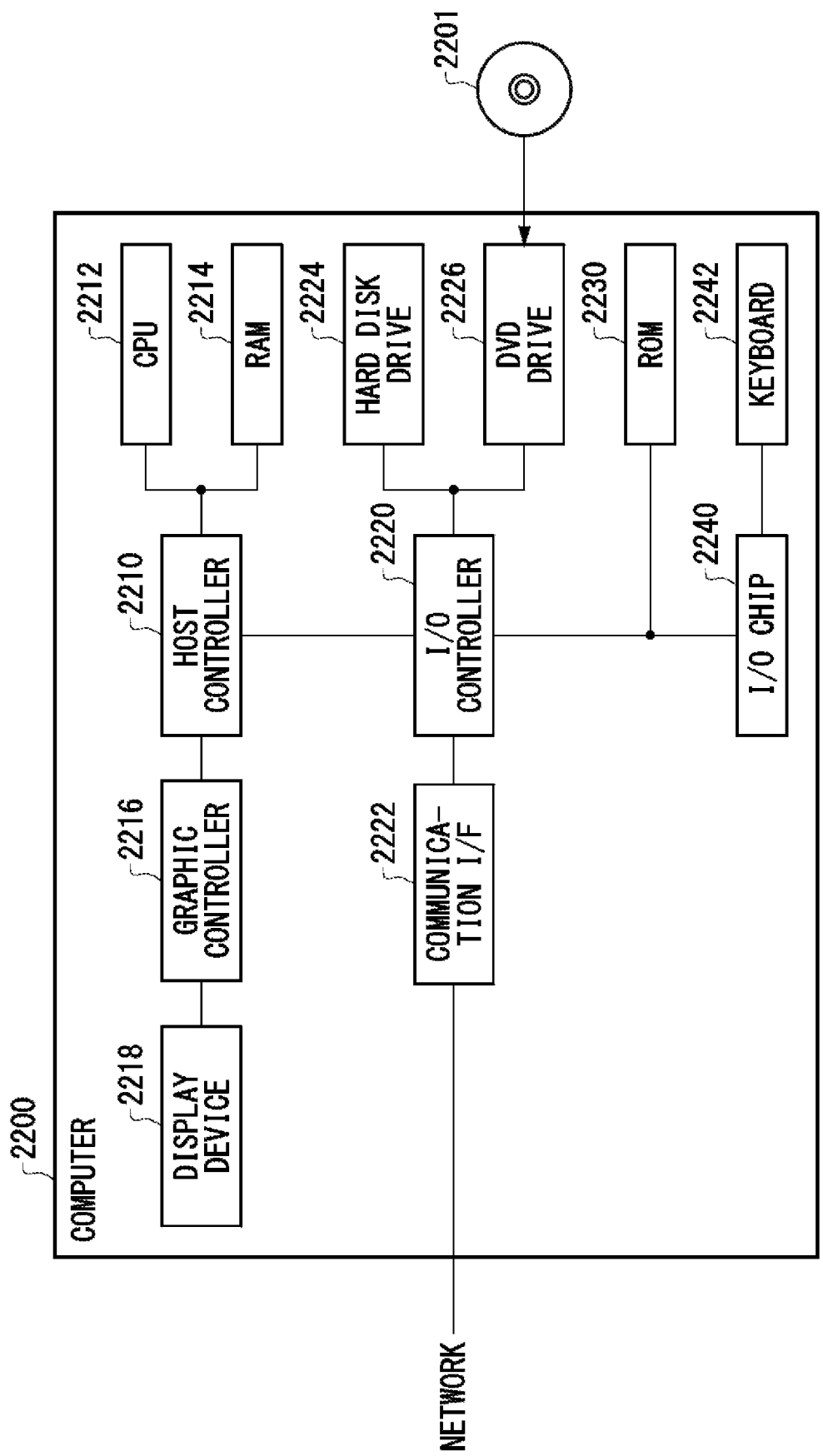
FIG. 8 shows one example of a configuration of a computer 2200 according to this embodiment.

FIG. 8 shows an example of a computer 2200 in which aspects of the present invention may be wholly or partly embodied. A program that is installed in the computer 2200 can cause the computer 2200 to function as or perform operations associated with apparatuses of the embodiments of the present invention or one or more sections thereof, and/or cause the computer 2200 to perform processes of the embodiments of the present invention or steps thereof. Such a program may be executed by the CPU 2212 to cause the computer 2200 to perform certain operations associated with some or all of the blocks of flowcharts and block diagrams described herein.

The computer 2200 according to this embodiment includes a CPU 2212, a RAM 2214, a graphic controller 2216, and a display device 2218, which are mutually connected by a host controller 2210. The computer 2200 also includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphic controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port, and the like to the input/output controller 2220.

A program is provided by computer-readable media such as the DVD-ROM 2201 or the IC card. The program is read from the computer-readable media, installed into the hard disk drive 2224, RAM 2214, or ROM 2230, which are also examples of computer-readable media, and executed by the CPU 2212. The information processing described in these programs is read into the computer 2200, resulting in cooperation between the program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording medium.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, etc., and perform various types of processing on the data on the RAM 2214. The CPU 2212 may then write back the processed data to the external recording medium.

Various types of information, such as various types of programs, data, tables, and databases, may be stored in the recording medium to undergo information processing. The CPU 2212 may perform various types of processing on the data read from the RAM 2214, which includes various types of operations, information processing, condition judging, conditional branch, unconditional branch, search/replace of information, etc., as described throughout this disclosure and designated by an instruction sequence of programs, and writes the result back to the RAM 2214. In addition, the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable media on or near the computer 2200.

In addition, a recording medium such as a hard disk or a RAM provided in a server system connected to a dedicated communication network or the Internet can be used as the computer-readable media, thereby providing the program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

For example, the power conditioner 30 shown above has the above-mentioned various configurations and functions. Alternatively, the power conditioner 30 may not have some of the above-mentioned various configurations and functions as appropriate.

For example, the detection apparatus 60 in the power conditioner 30 may not have the communication unit 90 when the detection apparatus 60 does not have the function of receiving a command from a power company. Also, the detection apparatus 60 may not have the flicker detection unit 85 when the detection apparatus 60 does not have the function of changing the calculation method of the deviation parameter in response to detection of flicker. Also, the detection apparatus 60 may not have the time gap change unit 92 when the detection apparatus 60 does not have the function of changing the time gap between the first term and the second term. Also, the detection apparatus 60 may not have the term change unit 94 when the detection apparatus 60 does not have the function of changing the second term.

Also, the deviation parameter calculation unit 70 described above receives the time gaps between the first term and the second term from the time gap change unit 92 to calculate the deviation parameters according to them. Alternatively, the deviation parameter calculation unit 70 may calculate, in parallel or concurrently, the deviation parameters corresponding to the respective ones of a plurality of predetermined time gaps between the first term and the second term, and the time gap change unit 92 may preferentially select, from among the plurality of deviation parameters corresponding to the plurality of time gaps, a deviation parameter having a smaller amount of change. In this manner, the deviation parameter calculation unit 70 and the time gap change unit 92 can select an appropriate setting from among possible options more efficiently although the computation associated with the processing increases.

Similarly, the deviation parameter calculation unit 70 may calculate, in parallel or concurrently, the deviation parameters corresponding to the respective ones of a plurality of predetermined second terms of various lengths, and the time gap change unit 92 may preferentially select, from among the plurality of deviation parameters corresponding to the plurality of second terms of various lengths, a deviation parameter having a smaller amount of change.

Also, although the detection apparatus 60 described above changes the calculation method of the deviation parameter with occurrence of flicker and/or an instruction from a power company used as a trigger, the detection apparatus 60 may change the calculation method of the deviation parameter with the other events used as a trigger. For example, the detection apparatus 60 may change the calculation method of the deviation parameter used in the deviation parameter calculation unit 70 in response to a user of the power conditioner 30, an installation contractor, or the like manually inputting a calculation method of the deviation parameter.

Also, the detection apparatus 60 may dynamically switch the time gap between the first term and the second term and/or the deviation parameter such as the length of the second term at predetermined intervals, at random timing, or the like. In this manner, the detection apparatus 60 can suppress the excited state which may occur when the calculation method of the deviation parameter is fixed.

Also, in the above, although the various calculation methods for calculating the representative value of the frequency parameters in the second term are described, the calculation method of the representative value of the frequency parameters in the first term may be also changed to other methods beyond the moving average value as appropriate.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A detection apparatus, comprising:
   a frequency parameter calculation unit configured to calculate frequency parameters according to frequencies of power supplied by a power supply;
   a deviation parameter calculation unit configured to calculate a deviation parameter according to a frequency deviation based on the frequency parameters in a first term and the frequency parameters in a second term earlier than the first term;
   an islanding operation detection unit configured to detect whether the power supply is in an islanding operation based on the deviation parameter; and
   a time gap change unit configured to increase a predetermined length of a time gap between the first term and the second term for a subsequent cycle based on the deviation parameter.

2. The detection apparatus according to claim 1, further comprising
   a flicker detection unit configured to detect whether flicker occurs in the power supplied by the power supply, wherein
   the time gap change unit increases the predetermined length of the time gap between the first term and the second term for a subsequent cycle in response to detection of flicker.

3. A detection apparatus, comprising:
   a frequency parameter calculation unit configured to calculate frequency parameters according to frequencies of power supplied by a power supply;
   a deviation parameter calculation unit configured to calculate a deviation parameter according to a frequency deviation based on the frequency parameters in a first term and the frequency parameters in a second term earlier than the first term;
   an islanding operation detection unit configured to detect whether the power supply is in an islanding operation based on the deviation parameter;
   a time gap change unit configured to change a time gap between the first term and the second term; and
   a flicker detection unit configured to detect whether flicker occurs in the power supplied by the power supply, wherein
   the time gap change unit changes the time gap between the first term and the second term in response to detection of flicker; and
   in a case in which the time gap between the first term and the second term has been changed from a first time gap to a second gap in response to detection of flicker, the time gap change unit changes the time gap between the first term and the second term to a third time gap different from the first time gap and the second time gap in response to further detection of flicker.

4. A detection apparatus, comprising:
   a frequency parameter calculation unit configured to calculate frequency parameters according to frequencies of power supplied by a power supply;
   a deviation parameter calculation unit configured to calculate a deviation parameter according to a frequency deviation based on the frequency parameters in a first term and the frequency parameters in a second term earlier than the first term;
   an islanding operation detection unit configured to detect whether the power supply is in an islanding operation based on the deviation parameter;
   a time gap change unit configured to change a time gap between the first term and the second term; and
   a flicker detection unit configured to detect whether flicker occurs in the power supplied by the power supply, wherein
   the time gap change unit changes the time gap between the first term and the second term in response to detection of flicker; and the time gap change unit continues to change the time gap between the first term and the second term by using a plurality of predetermined time gaps in a predetermined order until flicker is no longer detected.

5. A detection apparatus comprising:
a frequency parameter calculation unit configured to calculate frequency parameters according to frequencies of power supplied by a power supply;
a deviation parameter calculation unit configured to calculate a deviation parameter according to a frequency deviation based on the frequency parameters in a first term and the frequency parameters in a second term earlier than the first term;
an islanding operation detection unit configured to detect whether the power supply is in an islanding operation based on the deviation parameter;
a time gap change unit configured to change a time gap between the first term and the second term; and
a flicker detection unit configured to detect whether flicker occurs in the power supplied by the power supply, wherein
the time gap change unit changes the time gap between the first term and the second term in response to detection of flicker;
the flicker detection unit calculates a flicker period parameter according to a period of flicker, and
the time gap change unit changes the time gap between the first term and the second term to a value based on the flicker period parameter.

6. The detection apparatus according to claim 2, further comprising
a term change unit configured to change a length of the second term.

7. The detection apparatus according to claim 6, wherein
the term change unit changes the length of the second term in response to detection of flicker.

8. A detection apparatus comprising:
a frequency parameter calculation unit configured to calculate frequency parameters according to frequencies of power supplied by a power supply;
a deviation parameter calculation unit configured to calculate a deviation parameter according to a frequency deviation based on the frequency parameters in a first term and the frequency parameters in a second term earlier than the first term;
an islanding operation detection unit configured to detect whether the power supply is in an islanding operation based on the deviation parameter;
a time gap change unit configured to change a time gap between the first term and the second term;
a flicker detection unit configured to detect whether flicker occurs in the power supplied by the power supply; and
a term change unit configured to change a length of the second term, wherein
the term change unit changes the length of the second term in response to detection of flicker,
the time gap change unit changes the time gap between the first term and the second term in response to detection of flicker; and
when making the second term longer, the term change unit calculates the frequency parameters in the second term by thinning out the frequency parameters sampled during the second term.

9. A detection apparatus comprising:
a frequency parameter calculation unit configured to calculate frequency parameters according to frequencies of power supplied by a power supply;
a deviation parameter calculation unit configured to calculate a deviation parameter according to a frequency deviation based on the frequency parameters in a first term and the frequency parameters in a second term earlier than the first term;
an islanding operation detection unit configured to detect whether the power supply is in an islanding operation based on the deviation parameter;
a time gap change unit configured to change a time gap between the first term and the second term;
the deviation parameter calculation unit calculates the deviation parameter corresponding to each of a plurality of predetermined time gaps between the first term and the second term, and
the time gap change unit preferentially selects, from among the plurality of deviation parameters corresponding to the plurality of time gaps, a deviation parameter having a smaller amount of change.

10. The detection apparatus according to claim 1, further comprising
a reactive power injection unit configured to inject reactive power according to the deviation parameter into a power supply route.

11. A detection apparatus comprising
a frequency parameter calculation unit configured to calculate frequency parameters according to frequencies of power supplied by a power supply;
a deviation parameter calculation unit configured to calculate a deviation parameter according to a frequency deviation based on the frequency parameters in a first term and the frequency parameters in a second term earlier than the first term;
an islanding operation detection unit configured to detect whether the power supply is in an islanding operation based on the deviation parameter;
a time gap change unit configured to change a time gap between the first term and the second term; and
a communication unit configured to communicate with an apparatus of a power company, wherein
the time gap change unit changes the time gap between the second term and the first term to a time gap designated by an instruction received from the apparatus of the power company.

12. The detection apparatus according to claim 1, wherein
the deviation parameter calculation unit calculates the deviation parameter based on a value obtained by performing low-pass filtering on the frequency parameters having a plurality of periods within the second term.

13. A power conditioner, comprising:
a power conversion unit configured to convert power from a distributed power supply into alternating current compatible with a grid power supply; and
the detection apparatus according to claim 1.

14. The detection apparatus according to claim 9, further comprising
a flicker detection unit configured to detect whether flicker occurs in the power supplied by the power supply, wherein
the time gap change unit changes the time gap between the first term and the second term for a subsequent cycle in response to detection of flicker.

15. The detection apparatus according to claim 11, further comprising a flicker detection unit configured to detect whether flicker occurs in the power supplied by the power supply, wherein the time gap change unit changes the time gap between the first term and the second term for a subsequent cycle in response to detection of flicker.

16. The detection apparatus according to claim 3, further comprising a term change unit configured to change a length of the second term, wherein the term change unit changes the length of the second term in response to detection of flicker.

17. The detection apparatus according to claim 4, further comprising a term change unit configured to change a length of the second term, wherein the term change unit changes the length of the second term in response to detection of flicker.

18. The detection apparatus according to claim 5, further comprising a term change unit configured to change a length of the second term, wherein the term change unit changes the length of the second term in response to detection of flicker.

\* \* \* \* \*